April 14, 1925.

F. TATAY 1,533,713

HELICOPTER MECHANISM FOR FLYING MACHINES

Filed April 10, 1924　　2 Sheets-Sheet 1

INVENTOR
Frank Tatay
BY
ATTORNEY

April 14, 1925.  1,533,713
F. TATAY
HELICOPTER MECHANISM FOR FLYING MACHINES
Filed April 10, 1924  2 Sheets-Sheet 2
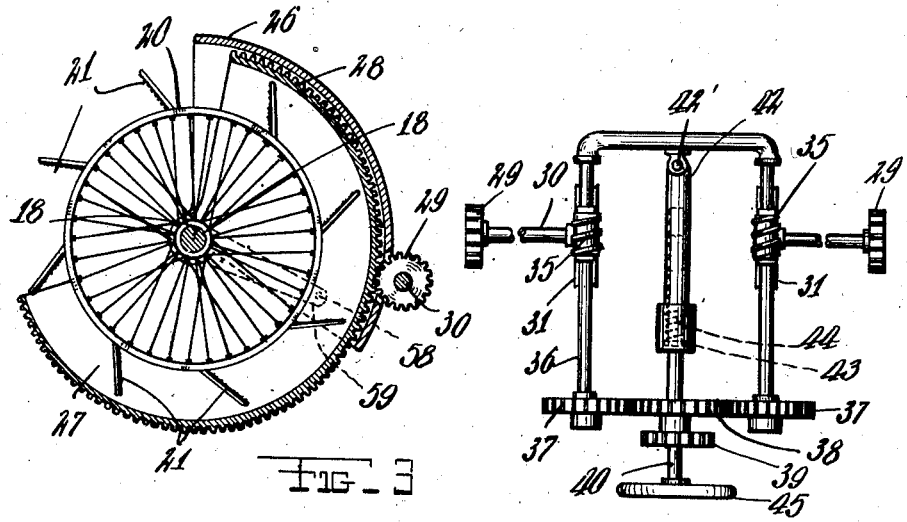
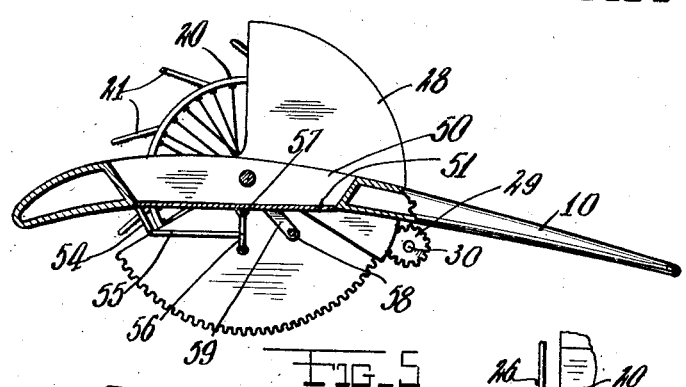
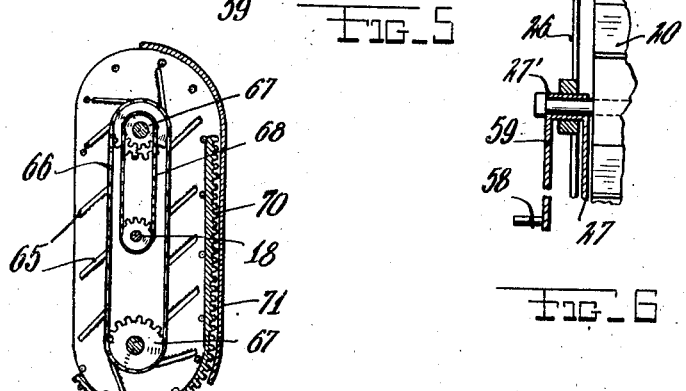
INVENTOR
Frank Tatay
BY
ATTORNEY Patented Apr. 14, 1925.

1,533,713

UNITED STATES PATENT OFFICE.

FRANK TATAY, OF NEW YORK, N. Y.

HELICOPTER MECHANISM FOR FLYING MACHINES.

Application filed April 10, 1924. Serial No. 705,485.

*To all whom it may concern:*

Be it known that I, FRANK TATAY, citizen of the United States, residing at New York city, in the county of New York and State of New York, have invented certain new and useful Improvements in Helicopter Mechanism for Flying Machines, of which the following is a specification.

This invention relates to flying machines, and it has for an object the provision of a novel form of arrangement for use in causing the machine to ascent or descend, a further object relating to the provision of planes with openings therein which are normally closed by shutters or valves which may be opened when the machine is to descend, and to the arrangement of the means for causing upward and downward flight in a manner to facilitate the maintaining of lateral balance.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of my improved helicopter flying machine.

Fig. 3 is an enlarged detail longitudinal sectional view taken on the line 3—3 of Fig. 1.

Fig. 4 is a detail plan view of the control means.

Fig. 5 is a detail longitudinal sectional view taken on the line 5—5 of Fig. 1.

Fig. 6 is a detail sectional view showing the means for opening the valves which control the openings in the wings.

Fig. 7 is a diagrammatic view showing a slightly modified arrangement of the wheels.

Figure 1:
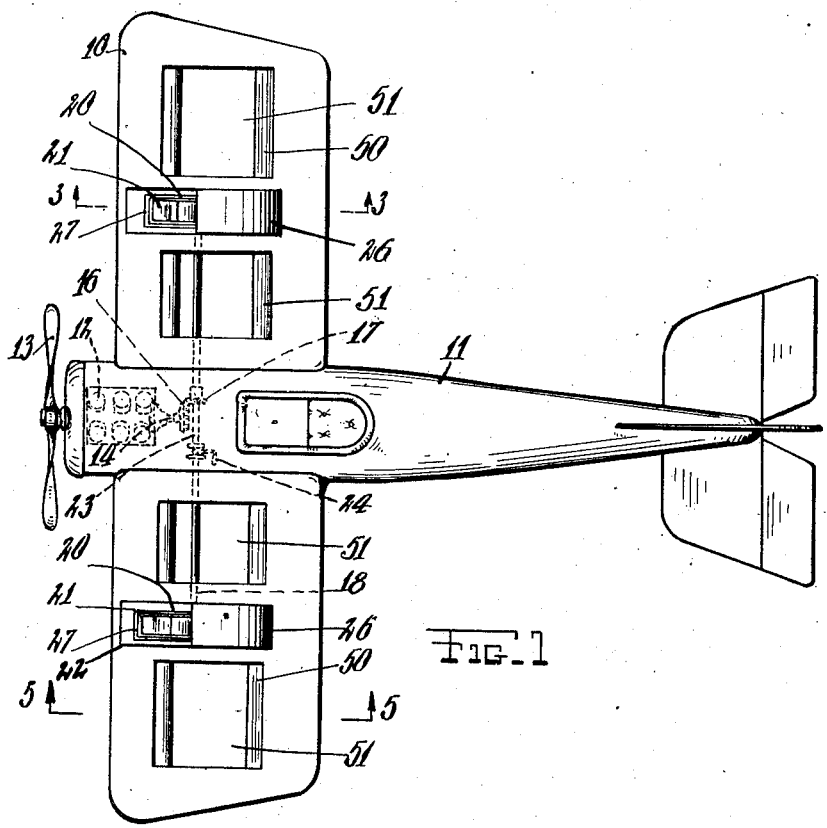
Figure 2:
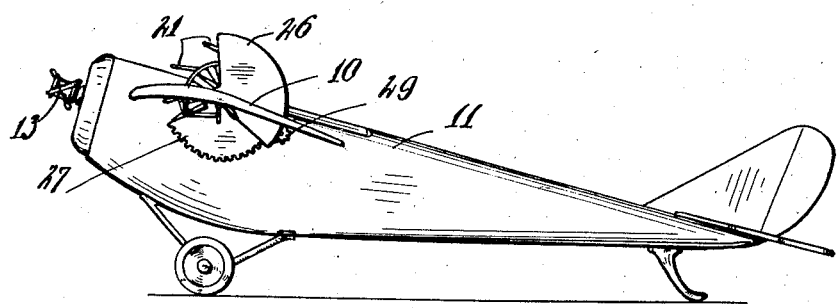
Fig. 2 is a side view thereof.

In the drawings the reference numeral 10 indicates the monoplane wings with which my improved machine is equipped, and 11 the body or fuselage from which the wings project. In the front end of the body is an ordinary internal combustion engine 12 which may drive a helical propeller 13 which is fixed on the front end of its shaft 14. Upon the rear end of this shaft 14 is fixed a bevel gear 16 which meshes with a like gear 17 loose on a transverse shaft 18 which extends laterally from the body 11 through the wings 10. Upon the ends of this shaft are fixed the helicopter wheels 20 which have the helicopter vanes 21 mounted on their rims, which vanes are suitably inclined so as to exert a downward beat on the air at the forward sides of the wheels, the direction of rotation of the wheels being such that the vanes move downward over the forward sides of the wheels. These wheels 20 are mounted in suitable openings 22 in the planes or wings 10. The bevel gear 17 is adapted to be operatively engaged with the shaft 18 by means of a clutch 23 feathered on the latter and engaging a clutch face on the hub of the said gear, the clutch 23 being shifted along the shaft by means of a hand lever 24.

The rear halves of the helicopter wheels 20 are covered by the fixed semi-cylindrical housings 26 which are suitably mounted on the wings 10, while the front halves of the said wheels may be covered to a greater or less extent by means of the movably semi-cylindrical housings 27 which are freely mounted on the ends of the shaft 18 to swing around the latter so as to vary the degree of exposure of the wheels on the front sides thereof. For adjustment of these housings 27 they are provided with gear teeth 28 on their peripheries which are engaged by gear pinions 29 on the outer ends of the alined transverse shafts 30 which have worm pinions 31 fixed to their inner ends. These shafts 30 may be supported by suitable bearing elements under the wings and they project at their inner ends, which are spaced from one another, into the body 11.

I here provide means whereby these shafts may be rotated in unison to simultaneously effect a corresponding adjustment of each housing 27 or may be given a relatively independent movement. As here shown the worm gears are engaged by the worm pinions 35 on the short shafts 36 extending longitudinally in the body one adjacent each side of the latter. Upon these shafts are fixed the gears 37 which are in juxtaposed relation on the respective shafts and are adapted to be engaged by either one of a pair of gears 38 and 39 on a third shaft 40 located centrally between the shafts 36. The gears on the shaft 40 are of such relative size that the larger gear 38 may mesh at once with both of the gears 37 while the smaller gear 39 may mesh at once with only one of the said gears 37, the shaft 40 being mounted for both swinging and longitudinal movement to bring the proper gears into mesh. As here shown the shaft 40 is telescopically engaged at one end in tubular member 42 which is pivoted as at 42' to swing from side to side. Fixed on the shaft 40 is a collar 43 which is engaged with a spring 44 in the tubular member to retain the shaft 40 in position with the gear 38 thereon in registry with the gears 37 on the shafts 36, engagement of this collar with a suitable inturned flange on the end of the member 42 limiting the outward movement of the shaft 40. The latter has a handwheel 45 on its projecting end. It will be apparent that by positioning the shaft 40 longitudinally with the gear 38 in mesh with the gears 37 the two housings 27 may be adjusted simultaneously, while by moving the shaft longitudinally and then swinging the shaft laterally to bring the gear 39 into mesh with the desired one of the gears 37 either of said housings may be adjusted independently on the other.

To more readily allow the machine to descend I preferably provide one or more openings 50 in the wings which are normally closed by suitable shutters or valves 51 which latter may be opened when the machine is descending. These valves 51 are in the form of flaps hinged at their forward ends to the bottom of the wings 10 to swing downwardly to uncover the openings. I have here provided means whereby the said flaps are opened automatically when the housings 27 are moved to positions completely or substantially covering the wheels 20. As here shown an arm 54 is fixed to each flap 51 co-axially therewith and is connected by a link 55 with another arm 56 which is pivoted under the plane or wing as at 57 and which is adapted to be engaged by a stud 58 projecting from an arm 59 fixed to and projecting radially from a hub extension 27' of the housing 27. When the housing is swung a sufficient distance this stud 58 engages the arm 56 and swings the valve 51 open.

By means of my improved helicopter arrangement I am thus enabled to control the flying machine at will for ascent or descent, and to maintain lateral balance.

As shown in Fig. 7 I may make the helicopters of oval form and construct them of vanes 65 mounted on an endless band 66 which is engaged with sprocket wheels 67, one of which is driven from the shaft 18 by a chain 68, the edges of the band 66 being engaged in suitable guide elements. A flexible adjustable apron 70 is mounted in the housing 71 to vary the opening therein, this apron being guided in suitable elements in the housing 71 and adapted for adjustment by means similar to that already described.

While I have illustrated and described a preferred embodiment of my invention it is to be understood that I do not limit myself to the precise construction herein shown, and that various changes and modifications might be made therein without departing from the spirit and scope of the invention as defined in the appended claims.

Having thus described my invention, what I claim as new and desire to protect by Letters Patent of the United States is as follows:—

1. A flying machine having a pair of paddle wheels arranged on axes transverse to the machine, fixed housings covering the rear halves of the said wheels and rotary housings adapted to cover to varying extents the front halves of said wheels, a manually operable element for adjusting said housings, and means whereby said manually operable element may be selectively operatively connected to both of said housings or to either one alone to adjust the same either independently of one another or in unison.

2. A flying machine having a pair of paddle wheels arranged on axes transverse to the machine, fixed housings covering the rear halves of the said wheels and rotary housings adapted to cover to varying extents the front halves of said wheels, and means for adjusting said housings either independently of one another or in unison, including gear teeth formed on said housings, a pair of shafts having gear connections with the respective gears on the housings, gears on said pair of shafts, a third shaft located between said pair of shafts, and gears on said third shaft adapted to selectively engage the gears on the said pair of shafts.

3. A flying machine having a pair of paddle wheels arranged on axes transverse to the machine, fixed housings covering the rear halves of the said wheels and rotary housings adapted to cover to varying extents the front halves of said wheels, and means for adjusting said housings either independently of one another or in unison, including gear teeth formed on said housings, a pair of shafts having gear connections with the respective gears on the housings, gears on said pair of shafts, a third shaft located between said pair of shafts, and gears on said third shaft adapted to selectively engage the gears on the said pair of shafts, one of said gears on the third shaft being larger than the other and adapted to simultaneously engage both of the said gears on the said pair of shafts.

4. A flying machine having a pair of paddle wheels arranged on axes transverse to the machine, fixed housings covering the rear halves of the said wheels and rotary housings adapted to cover to varying extents the front halves of said wheels, and means for adjusting said housings either independently of one another or in unison, including gear teeth formed on said housings, a pair of shafts having gear connections with the respective gears on the housings, gears on said pair of shafts, a third shaft located between said pair of shafts, and gears on said third shaft adapted to selectively engage the gears on the said pair of shafts, one of said gears on the third shaft being larger than the other and adapted to simultaneously engage both of the said gears on the said pair of shafts, said third shaft being mounted for swinging movement to permit of selective engagement of the other gear thereon with either of the gears on the said pair of shafts.

5. A flying machine having a pair of paddle wheels arranged on axes transverse to the machine, fixed housings covering the rear halves of the said wheels, and rotary housings adapted to cover to varying extents the front halves of said wheels, a pair of wings on said machine, said wings having openings therein, valves normally closing said openings, and means whereby said valves are opened by the said housings when the latter are swung to certain positions.

In testimony whereof I have affixed my signature.

FRANK TATAY.